United States Patent [19]

Turoczi, Jr.

[11] 3,786,850

[45] Jan. 22, 1974

[54] BALANCED TIRE

[76] Inventor: Alexander Turoczi, Jr., R.D. 1, Box 133, Bath, Pa. 18014

[22] Filed: Jan. 13, 1972

[21] Appl. No.: 217,686

Related U.S. Application Data

[62] Division of Ser. No. 97,938, Dec. 12, 1970, Pat. No. 3,663,328.

[52] U.S. Cl. .............................. 152/330, 301/5 B
[51] Int. Cl. .......................................... B60b 13/00
[58] Field of Search 152/353, 330; 301/5 B; 156/75, 156/110 R, 116

[56] References Cited
UNITED STATES PATENTS

| | | | |
|---|---|---|---|
| 2,339,718 | 1/1944 | Periat | 301/5 B |
| 3,382,908 | 5/1968 | Palmquist et al. | 152/353 |
| 3,008,768 | 11/1961 | Kinsey et al. | 301/5 B |
| 1,692,145 | 11/1928 | Woolson | 301/5 B |

OTHER PUBLICATIONS

Centrifugal Lock Balancing Weights, Description, Price List, Instructions, American Racing Equipment, Received at P. O. 11-15-1963.

Primary Examiner—Gerald M. Forlenza
Assistant Examiner—Robert Saifer
Attorney, Agent, or Firm—Barry Moyerman

[57] ABSTRACT

A tire, balanced with respect to the wheel upon which it is mounted, utilizes a plurality of weights. These weights are in the form of indicia mounted upon the side walls of the tire, rather than upon the wheel, and are arcuately distributed to achieve both the required balance and a predetermined, highly visible, identifying and/or decorative effect which makes the tire readily recognizable and easily identifiable. An improved method of balancing a tire in accordance with the invention is also disclosed.

3 Claims, 2 Drawing Figures

BALANCED TIRE

This is a division, of application Ser. No. 97,938, filed Dec. 12, 1970, now U.S. Pat. No. 3,663,328.

BACKGROUND OF THE INVENTION

1. Field of the Invention

The invention relates to land vehicles, wheels and axles. More particularly, it relates to wheels of all types upon which inflatable rubber or rubber-like tires are mounted and wherein it is desired to overcome the inherent imbalance of the tires by the use of corrective weights.

2. Prior Art

Tire balancing requires, as a first step, the measuring of imbalance in a wheel-mounted tire. Two methods of measuring imbalance are currently employed. In the first method, called "static" balancing, tire imbalance is measured after removing the wheel-mounted tire from the vehicle. The second method, called "dynamic" balancing, measures imbalance with the wheel-mounted tire still on the vehicle.

Appropriate apparatus for measuring wheel imbalance is well-known and is disclosed, for example, in U. S. Pat. Nos. 2,301,958 and 3,164,996. In both "dynamic" or "static" balancing, the balancing apparatus normally gives a "read-out" which includes: (a) the total weight in ounces needed to correct the inherent imbalance of the tire and (b) the sector or "fan" within which the corrective weight must be confined. Customarily, the total weight required is divided into two equal portions (when weights are to be placed on only one side of the wheel) or four equal portions (when weights are to be placed on both sides of the wheel). These weights are then clamped on the rims of the wheels at the intersections of the radii defining the sector and the circumferential rim. As used henceforth herein, $\phi$ will designate the angle of "fan" or the angular distance between the sector-defining radii as indicated in the "read out."

The current practice of clamping weights onto wheel rims, not only makes for an unseemly appearance, but is deleterious to the magnesium-chrome wheels which are popular for sports cars. Magnesium-chrome rims are soft and easily damaged, and since rims of this material are normally selected for their beauty of shape and design, it is common practice today to avoid balancing these wheels altogether whenever possible. Further, contact with curbing or other obstructions can displace or knock off weights affixed in this manner. While it has been suggested in U. S. Pat. No. 2,640,727 that weights be concealed beneath the rim, this is not conventionally done.

Additionally, there must be recognition, albeit reluctantly, that we live in an age of increasing lawlessness. Tire theft from automobiles and other vehicles is on the increase. Thus, were the means for balancing wheels one which affected the appearance of the tire — making it unique, instantly recognizable from a distance and highly personal in appearance, theft would be discouraged due to the miscreant's fear of easy detection.

SUMMARY OF THE INVENTION

Briefly summarized, the invention comprises a balanced tire which achieves its balance by the use of a plurality of balancing indicia-shaped weights permanently affixed or adhered to the side walls thereof in a highly visible manner. These dual-functioning weights are of a predetermined number adapted, for example, to spell out the Christian name of the individual owner (e.g., ABE) or the name of the corporate owner (e.g., ACE TRUCKING).

The unit weight and location of the individual weights are determined as a function of the "read out" of the balancing device utilized. Thus, in the method of the invention, the total balancing weight required is divided by the number of indicia desired to give the unit weight needed per indicia. Then, indicia having this unit weight are circumferentially spaced apart over the sector determined by the balancing device and fanned over an arcuate side wall portion. If desired, the tire may be overbalanced on one side by use of more weight than indicated and then compensating weights arranged evenly about the bisector of $\phi$, on a diametrically opposed arc to give two decorated arcuate portions instead of just one. Further, the technique can be used to either perform all balancing on one side of the tire or, by halving the weight requirement per side, on both sides of the tire.

The weights are preferably rubber and may incorporate light-reflective material (e.g., glass micro-spheres) or decorative metallic particles. They are permanently affixed to the tire using rubber cement, epoxy adhesive formulations or mechanical fasteners. The tire is thus permanently balanced and marked for easy identification without any need for placing weights on or in contact with the wheel. This construction is particularly suitable for use with the magnesium wheels discussed above and serves, inter alia, to discourage theft.

It is, accordingly, an object of this invention to provide an improved method of balancing which eliminates clamping or otherwise fixing, weights on wheel rims.

It is a further object of this invention to provide a balanced tire which is attractive and easily identifiable and which can be marked with any legend or design predetermined by the user.

It is another object of this invention to provide a method of balancing automobile wheels that is especially applicable to wheels with magnesium-chrome rims.

Still another object of this invention is to provide a balanced tire which is of particular use for identification of the tires used by tire rental companies, bus companies, governmental agencies and contractors. Such tires can be used not only on cars, trucks and airplanes but also on equipment such as back-hoes, compressors, cranes, graders, house moving equipment and the like.

These and other objects will be more readily apparent to those skilled in the art from a consideration of the accompanying drawing and detailed description of exemplary embodiments.

DESCRIPTION OF THE PREFERRED EMBODIMENTS

Figure 1:
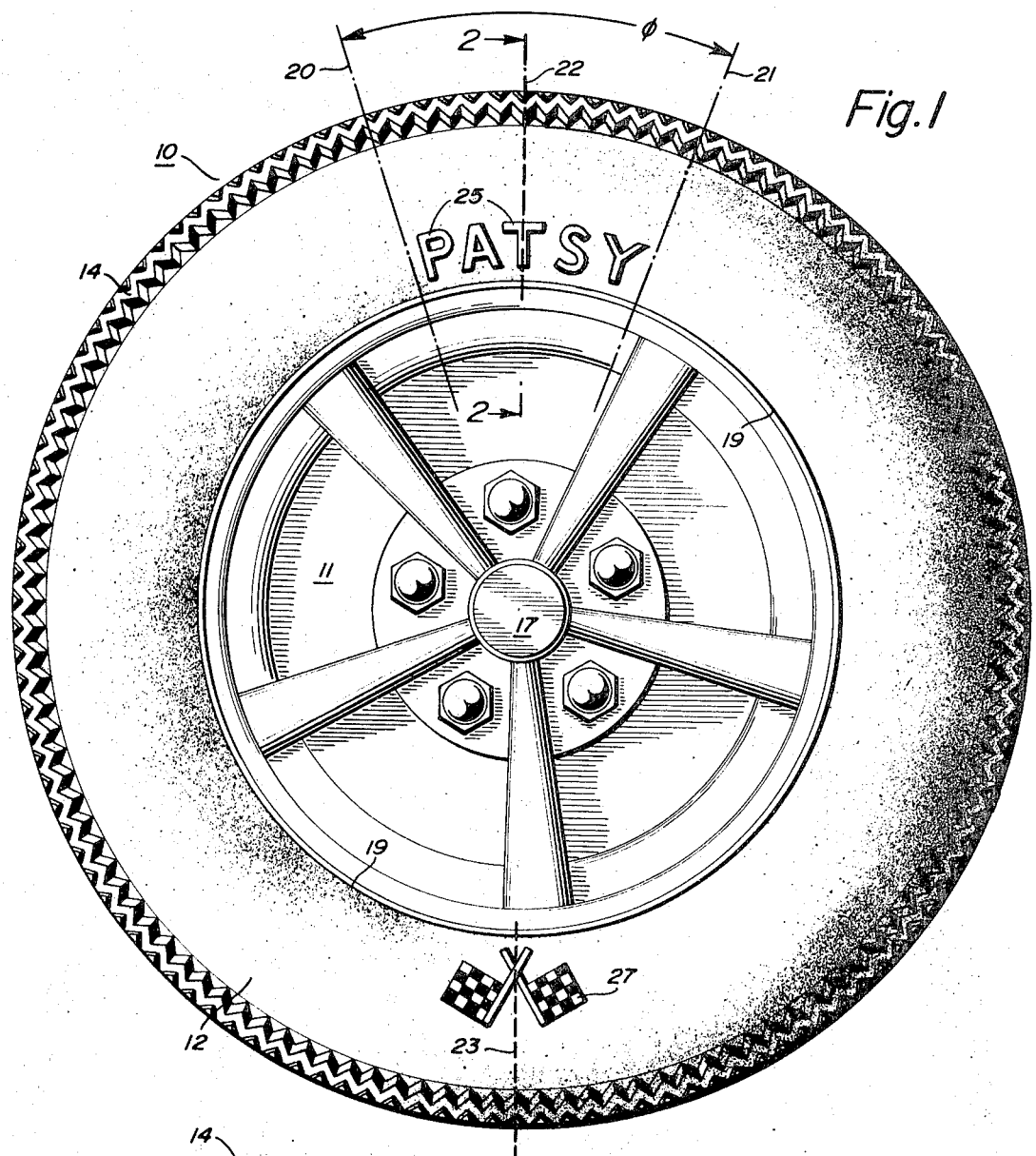
FIG. 1 is a front elevation of a balanced tire embodying my invention mounted on a magnesium wheel.

Referring to the drawing, FIG. 1 shows a tire, generally 10, mounted on a wheel, generally 11. The tire includes an outer sidewall 12 and an inner sidewall 13 on either side of a tread 14. Sidewall 12 terminates in a bead 15 and, similarly, sidewall 13 terminates in a bead 16. The wheel 12 includes a hub 17, an inside rim 18 and an outside rim 19. Tire 10 is conventionally mounted on wheel 11 by engagement between beads 16 and 15 and rims 18 and 19, respectively and engagement is maintained by suitable pneumatic pressure.

Any suitable balancing device is used to determine the total amount of corrective weight required and the location and extent of the angle $\phi$, which is the angular distance between the sector-defining radii 20 and 21. This same determination also fixed the location of bisector 22 and of the portion 23 thereof which is diametrically opposed to the sector between the indicated radii.

Figure 2:
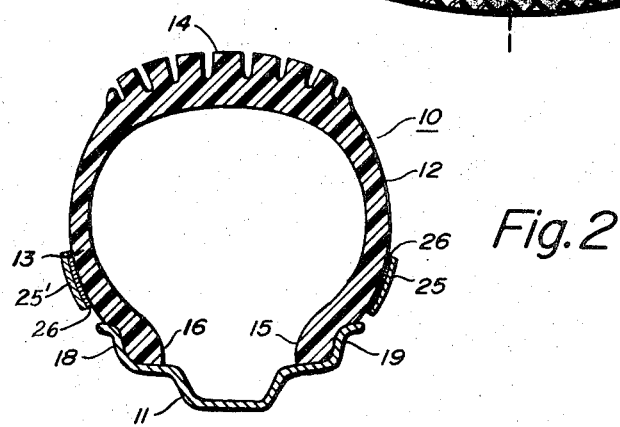
FIG. 2 is a section taken on 2—2 of FIG. 1.

FIG. 1 is a combined drawing which illustrates two embodiments of the invention. In the first embodiment, it is desired to personalize the tire 12 with the five-letter name PATSY. It has been conventionally determined that an imbalance of 10 ounces exists and the $\phi$ is 45°. A plurality of alphabetical indicia 25, having a weight of 2 ounces each, are affixed to sidewall 12 evenly spaced along a sector between radii 20 and 21. The weights are made of rubber and, as seen in FIG. 2, are in this embodiment mounted on the sidewall with a coating of epoxy resin 26.

A second embodiment of the invention, also illustrated in FIG. 1, utilizes five indicia 25 which weighs 2.2 oz. each and thus give, for the five letter name, a total weight of 11 ounces — thereby exceeding the desired corrective weight by one ounce. This overbalance (which may be created deliberately) is compensated for by the use of other indicia, here the single indicia 27 in the shape of a crossed flag. These other indicia total 1 ounce in weight (i.e., the excess of the previously added weight over the corrective weight) and are evenly spaced about bisector portion 23. A plurality of such weights may be used, arcuately and evenly spaced about portion 23. It is preferred that the distance from hub 17 to the arcuate centerlines of indicia 25 and 23 be equal, although both distance and weight can be adjusted to maintain corrective differential conditions while achieving a wide variety of previously determined decorative effects.

Were it desired to mark both sidewalls 12 and 13 in the same manner this could be done (in the first example) by 10 one ounce weights, five being mounted on each sidewall in overlying sectorial registration. This modification is represented, in FIG. 2, by weight 25'. Where decorative indicia 27 are also desired, one uses, for example, 10 alphabetical indicia 25, each weighing 1.1 ounces and counterbalances with two indicia 27 each weighing 0.5 ounces. Other possibilities will be readily apparent to those skilled in the art.

Although attaching the indicia to the sidewall is preferably by adhesion, any securing means which will permanently, and without damage, accomplish this purpose falls within my inventive concept.

Weights are preferably supplied in standard increments of 0.25 ounces by varying their size and/or thickness. It is a simple matter to supply these weights in the form of an alpha-numeric series and decorative shapes to create infinite decorative and legend-bearing effects.

Further, by modifying the indicia to include a coating of reflectant material, the tire provides night-time identification and safety.

Thus, the balanced wheel and balancing method described not only achieve the aforementioned objects, but provide safety, beauty, and economy previously unavailable.

While the invention has been illustrated and described in detail, such description is not exhaustive of the various possible permutations of the invention. Since it will be apparent to those skilled in the art that numerous changes and modifications may be made, it is not intended that the invention be construed as limited to the specific embodiments disclosed. Rather, its scope is to be limited only by a reasonable interpretation of the appended claims.

I claim:

1. A balanced wheel comprising, in combination, a rim, a tire mounted on said rim, and a plurality of weights affixed to at least one side wall of said tire, each of said weights being in the shape of a letter — their number and type being that necessary to convey a predetermined legend — and their total combined weight and spread being that necessary to correct the imbalance of said mounted tire which existed prior to their affixation, said letter-weights having been selected for affixation for sets of such weights which differ, from set to set, only as to the weight of each given letter.

2. The wheel of claim 1 wherein said letters are provided with a light-reflective coating which renders them more visible.

3. The wheel of claim 1 wherein the weights are divided equally into two groups, each group having half the total weight necessary to correct the imbalance, one of said groups being affixed to one sidewall of the tire and the other of said groups being affixed to the other sidewall of the tire — each group being positioned on opposite sides of the tire in overlying sectorial registration.

* * * * *